US012652626B2

(12) United States Patent
Machireddy et al.

(10) Patent No.: US 12,652,626 B2
(45) Date of Patent: Jun. 9, 2026

(54) CLOCK SELECTION IN A FRONTHAUL NETWORK

(71) Applicant: Rakuten Symphony, Inc., Tokyo (JP)

(72) Inventors: Ramana Reddy Machireddy, Bangalore (IN); Sridhar Bhaskaran, Bangalore (IN); Manasi Padhy, Bangalore (IN); Antonio Forenza, San Mateo, CA (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 610 days.

(21) Appl. No.: 17/925,758

(22) PCT Filed: Oct. 12, 2022

(86) PCT No.: PCT/US2022/077967
§ 371 (c)(1),
(2) Date: Nov. 16, 2022

(87) PCT Pub. No.: WO2024/081020
PCT Pub. Date: Apr. 18, 2024

(65) Prior Publication Data
US 2024/0224202 A1    Jul. 4, 2024

(51) Int. Cl.
*H04L 7/033*    (2006.01)
*H04L 27/26*    (2006.01)
(Continued)

(52) U.S. Cl.
CPC ................................. *H04W 56/001* (2013.01)

(58) Field of Classification Search
None
See application file for complete search history.

(56) References Cited

U.S. PATENT DOCUMENTS

2019/0245740 A1*    8/2019    Kachhla ................ H04L 41/045
2021/0219253 A1    7/2021    Van Phan et al.
(Continued)

FOREIGN PATENT DOCUMENTS

WO    2021/080478 A1    4/2021
WO    WO-2021168753 A1    9/2021

OTHER PUBLICATIONS

Beach et al. entitled COST Action CA15104 Assessment of 5G radio access techniques through experimental platforms, Jan. 2018 [Retrieved from URL: http://www.iracon.org/wp-content/uploads/2016/03/IRACON-D2B.pdf] [Retrieved from online on Dec. 19, 2022].

(Continued)

*Primary Examiner* — Sithu Ko
(74) *Attorney, Agent, or Firm* — Sughrue Mion, PLLC

(57) ABSTRACT

In general, the current subject matter relates to clock selection in a fronthaul network. In some implementations, clock selection in a fronthaul network can include selecting one distributed unit (DU) from among a plurality of DUs communicatively coupled to a radio unit (RU) to serve as a primary clock for a communication system including the plurality of DUs, the RU, and a service management and orchestration (SMO), and transmitting a request to the RU that triggers the RU to select one of the DUs to become the primary clock. The SMO can be communicatively coupled to the RU and the plurality of DUs.

20 Claims, 14 Drawing Sheets

(51) Int. Cl.
    *H04W 28/02*       (2009.01)
    *H04W 56/00*       (2009.01)
    *H04W 74/00*       (2009.01)

(56)            References Cited

U.S. PATENT DOCUMENTS

| | | | |
|---|---|---|---|
| 2021/0243797 A1 | 8/2021 | Reddy et al. | |
| 2021/0367693 A1* | 11/2021 | S | H04J 3/0697 |
| 2022/0159525 A1 | 5/2022 | Chou et al. | |
| 2023/0055590 A1* | 2/2023 | Sivaraj | H04W 28/02 |
| 2023/0059736 A1* | 2/2023 | Reddy | H04L 43/16 |
| 2023/0164756 A1* | 5/2023 | Vankayala | H04W 72/121 |
| | | | 370/329 |
| 2023/0209549 A1* | 6/2023 | Amuru | H04L 5/0044 |
| | | | 370/329 |
| 2024/0015676 A1* | 1/2024 | Chau | H04W 56/0015 |
| 2024/0224208 A1* | 7/2024 | Machireddy | H04W 56/002 |
| 2024/0259127 A1* | 8/2024 | Han | H04W 56/001 |
| 2024/0414753 A1* | 12/2024 | Li | H04W 72/0453 |

OTHER PUBLICATIONS

International Search Report and Written Opinion for Intl. Pat. App. No. PCT/US22/77967 mailed Jan. 27, 2023.
O-RAN Working Group 4 (Open Fronthaul Interfaces WG), Control, User and Synchronization Plane Specification, Mar. 31, 2022.
O-RAN Fronthaul Working Group, Conformance Test Specification, 2020.

* cited by examiner

1100

1200

CLOCK SELECTION IN A FRONTHAUL NETWORK

CROSS-REFERENCE TO RELATED APPLICATIONS

The present application claims priority to and is the 35 U.S.C. 371 United States National Phase application based on International Patent Application No. PCT/US22/77967, filed on Oct. 12, 2022, entitled "CLOCK SELECTION IN A FRONTHAUL NETWORK," which is hereby incorporated by reference in its entirety.

TECHNICAL FIELD

In some implementations, the current subject matter relates to telecommunications systems, and in particular, to clock selection in a fronthaul network.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

In an open radio access network (O-RAN), communications via the fronthaul network can be synchronized in time and frequency by synchronizing clocks of devices that communicate via the fronthaul network. The synchronization can allow messages communicated via the fronthaul network to be sent and received properly. The synchronization can be achieved using a timing grandmaster to which the clocks are synchronized. However, if the timing grandmaster fails, synchronization may also fail and thereby jeopardize proper communications on the fronthaul network.

SUMMARY

In some implementations, the current subject matter relates to a computer-implemented method. The method may include selecting one distributed unit (DU) from among a plurality of DUs communicatively coupled to a radio unit (RU) to serve as a primary clock for a communication system including the plurality of DUs, the RU, and a service management and orchestration (SMO), and transmitting a request to the RU that triggers the RU to select one of the DUs to become the primary clock. The SMO may be communicatively coupled to the RU and the plurality of DUS.

In some implementations, the current subject matter can include one or more of the following optional features. In some implementations, the SMO may trigger the selecting. Further, the SMO may transmit the request to the RU.

In some implementations, the SMO may trigger the selecting through one of the DUs to instruct the RU to perform the selecting. Further, the one of the DUs may transmit the request to the RU.

In some implementations, the method may further include receiving a signal from each of the DUs among the plurality of DUs capable of serving as a primary clock, and the selecting may be only among the plurality of DUs capable of serving as a primary clock.

In some implementations, a one of the DUs may be serving as the primary clock at a time of or just prior to the selecting being performed, and the method may further include removing the one of the DUs from consideration as being selected. Further, the removal may remove the one of the DUs from the selecting and from future selecting, and/or a failure of the one of the DUs may trigger the selecting.

In some implementations, the request may be a remote procedure call (RPC) request.

In some implementations, the communication system may include an Open Radio Access Network (O-RAN) architecture.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The current subject matter can provide for systems and methods that can be implemented in wireless communications systems. Such systems can include various wireless communications systems, including 5G New Radio communications systems, long term evolution communication systems, etc.

In general, the current subject matter relates to clock selection in a fronthaul network.

In some implementations of the current subject matter, a distributed unit (DU) can act as a timing grandmaster in an O-RAN architecture to synchronize timing and frequency on the architecture's fronthaul network. The O-RAN architecture can include a plurality of DUs with at least two of the DUs being capable of serving as a timing grandmaster for a plurality of radio units (RUS). Only one DU may serve as timing grandmaster at a time. If the DU currently serving as timing grandmaster experiences a problem, communications on the fronthaul connection may not occur properly or at all. Selecting a new timing grandmaster among the DUs capable of serving as timing grandmaster, but not currently serving as timing grandmaster, may allow the problematic DU currently serving as timing grandmaster to be relieved of its timing grandmaster duties so synchronization may properly happen using the new timing grandmaster. However, such switching to a different timing grandmaster DU is not currently supported by O-RAN, when the timing stack in the DU currently serving as timing grandmaster is running properly but there is a problem in rest of the DU application. In some implementations of the current subject matter, one DU among a plurality of DUs capable of serving as a timing grandmaster in an O-RAN architecture can be selected to serve as timing grandmaster.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1*a-c* and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
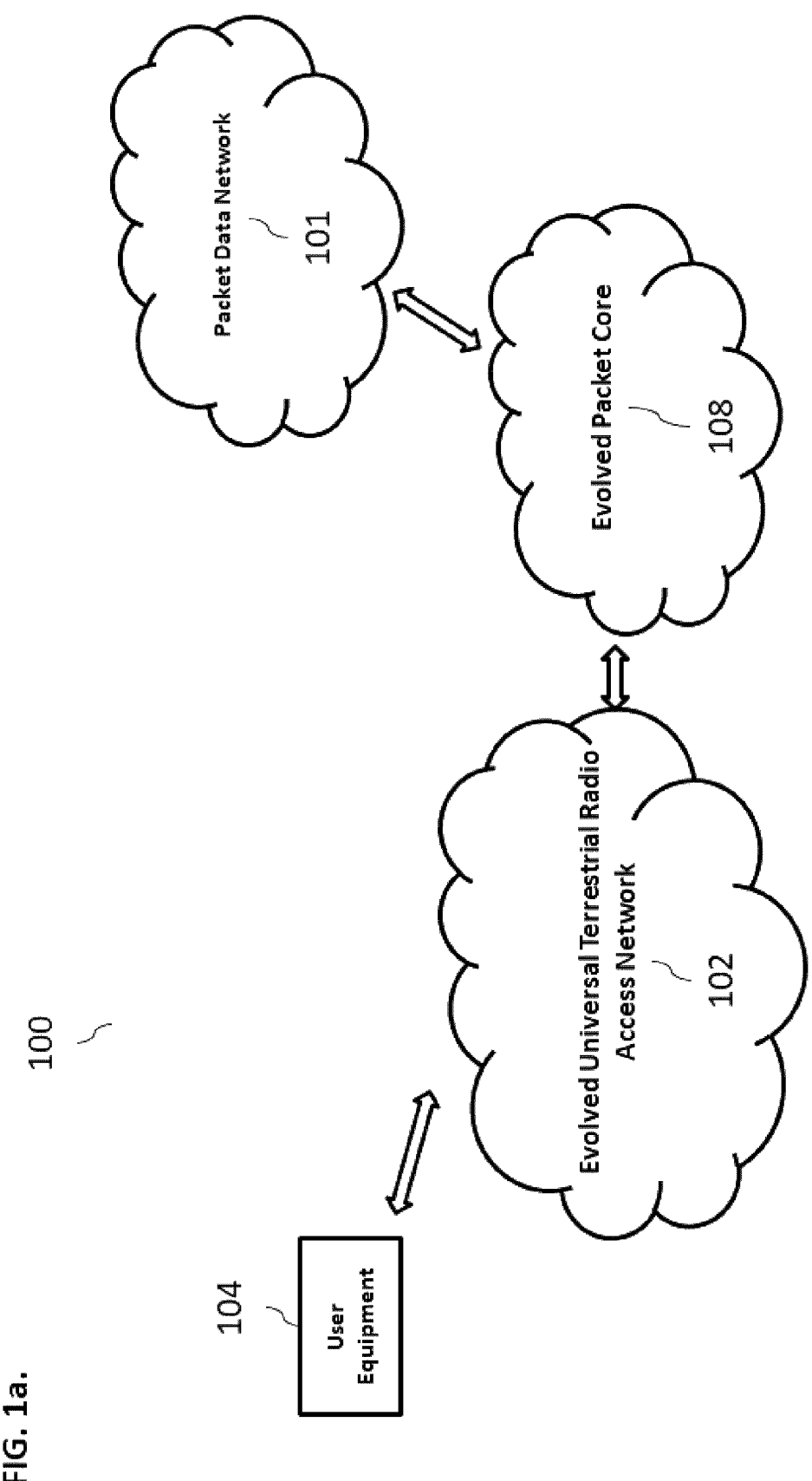
FIG. 1*a* illustrates an exemplary conventional long term evolution ("LTE") communications system.
Figure 1B:
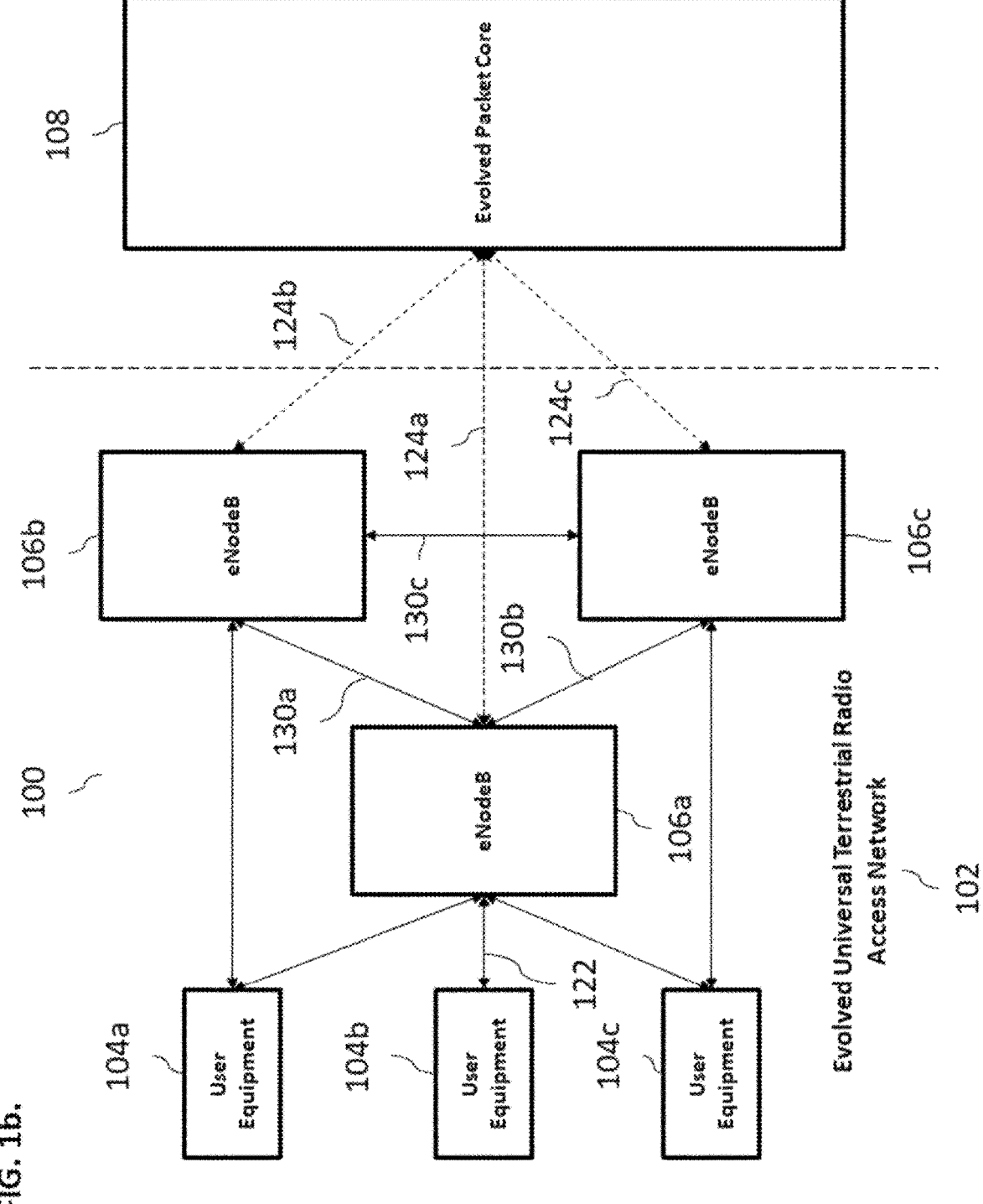
FIG. 1*b* illustrates further detail of the exemplary LTE system shown in FIG. 1*a;*

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
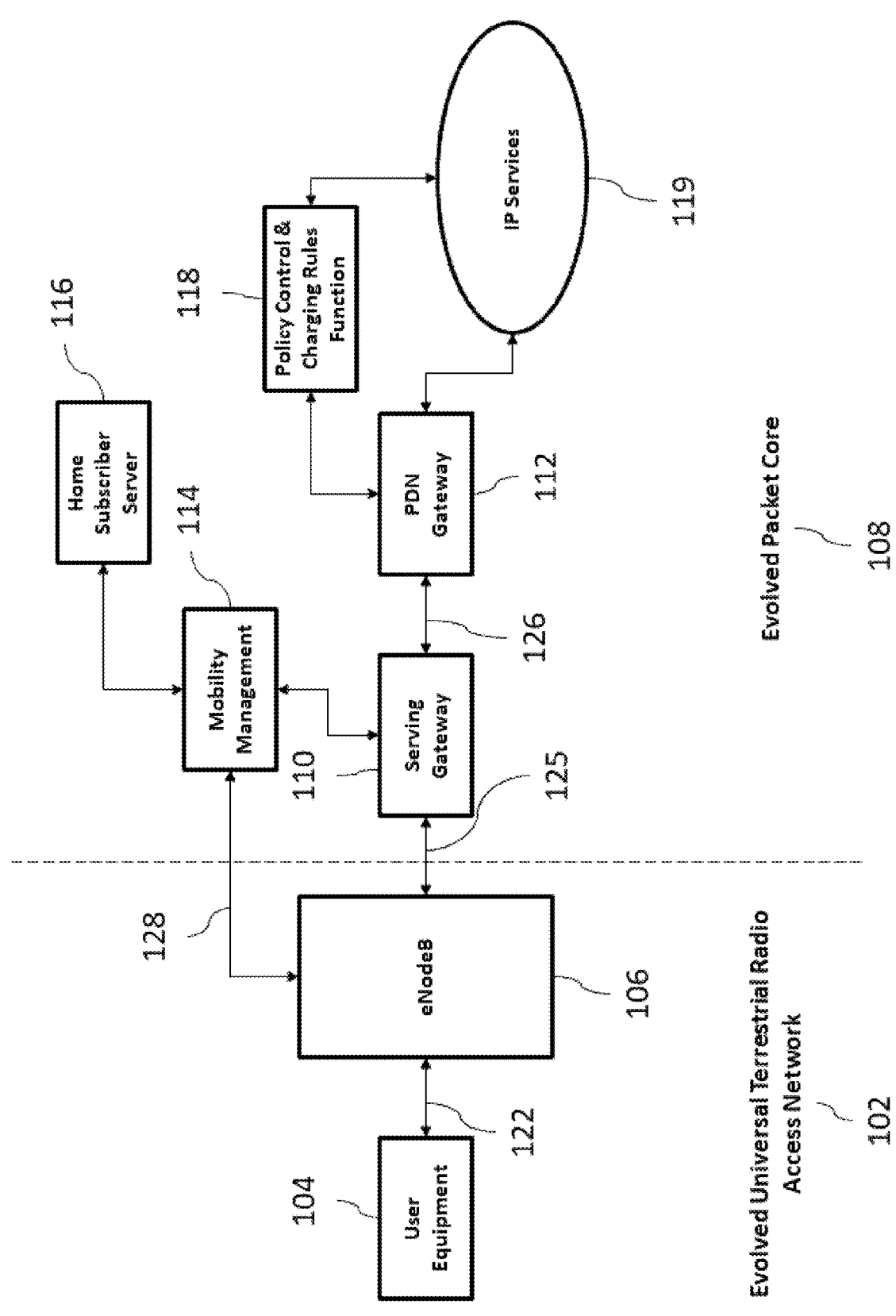
FIG. 1*c* illustrates additional detail of the evolved packet core of the exemplary LTE system shown in FIG. 1*a;*

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
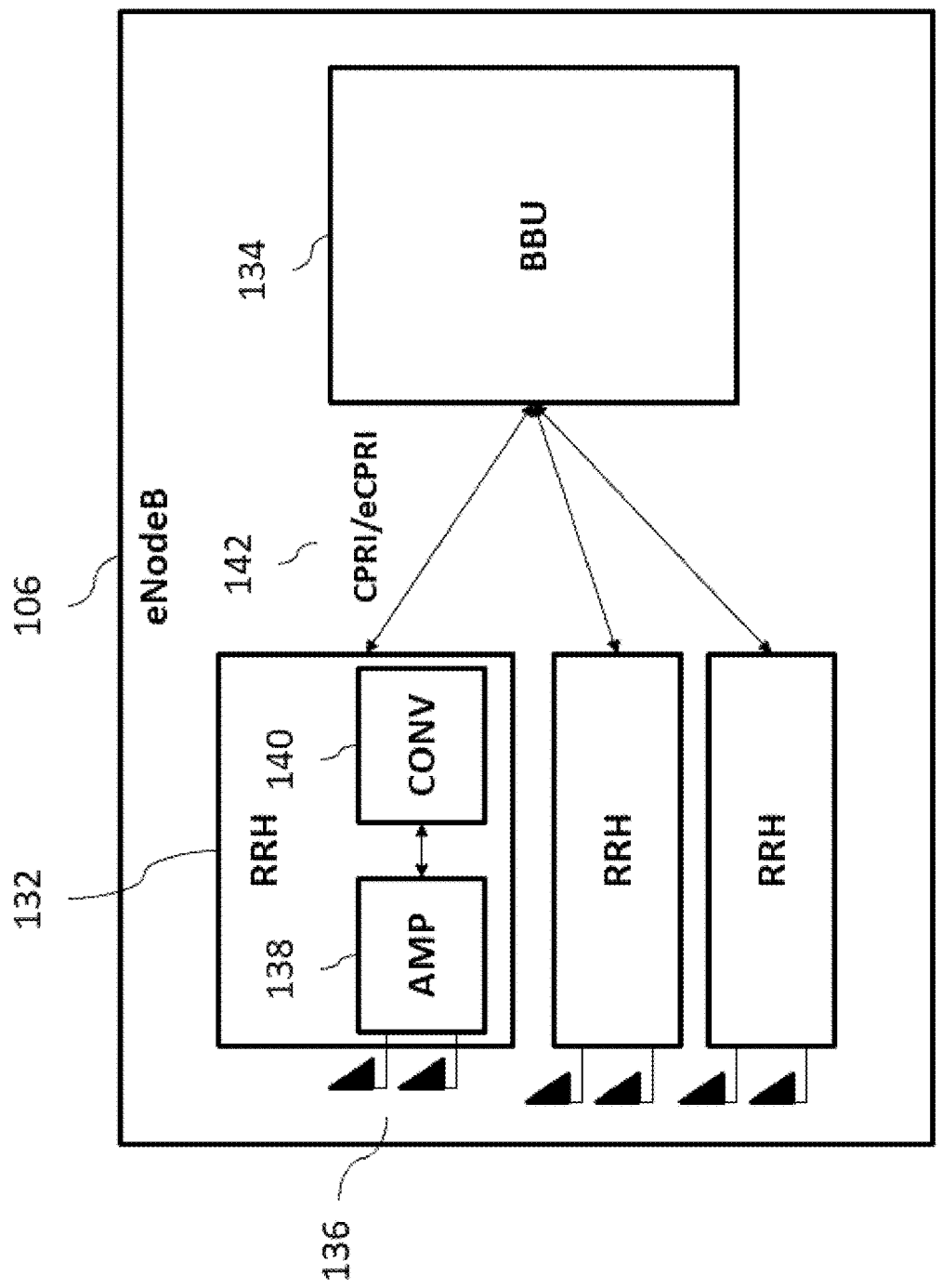
FIG. 1*d* illustrates an exemplary evolved Node B of the exemplary LTE system shown in FIG. 1*a;*

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
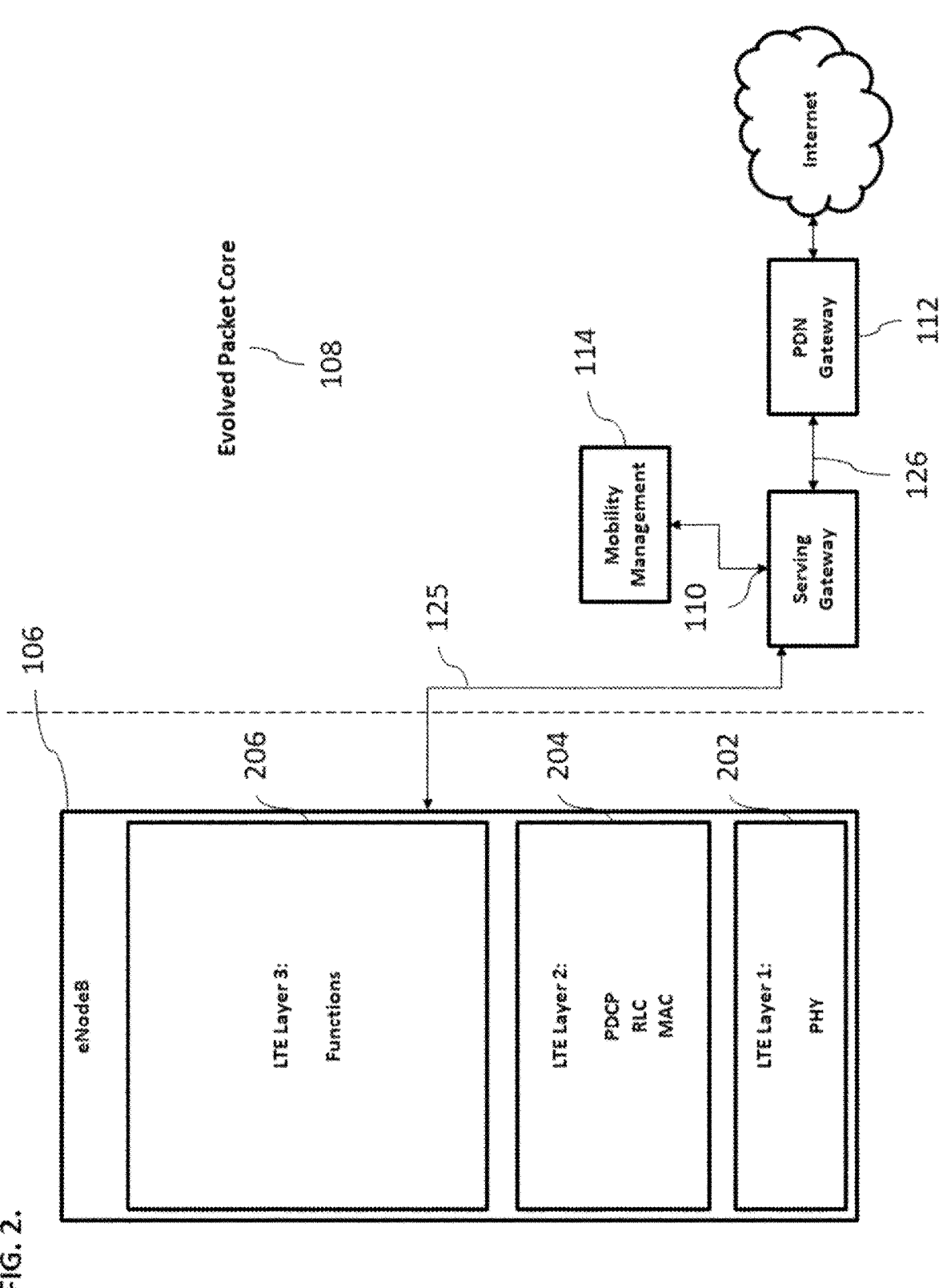
FIG. 2 illustrates further detail of an evolved Node B shown in FIGS. 1*a-d;*

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
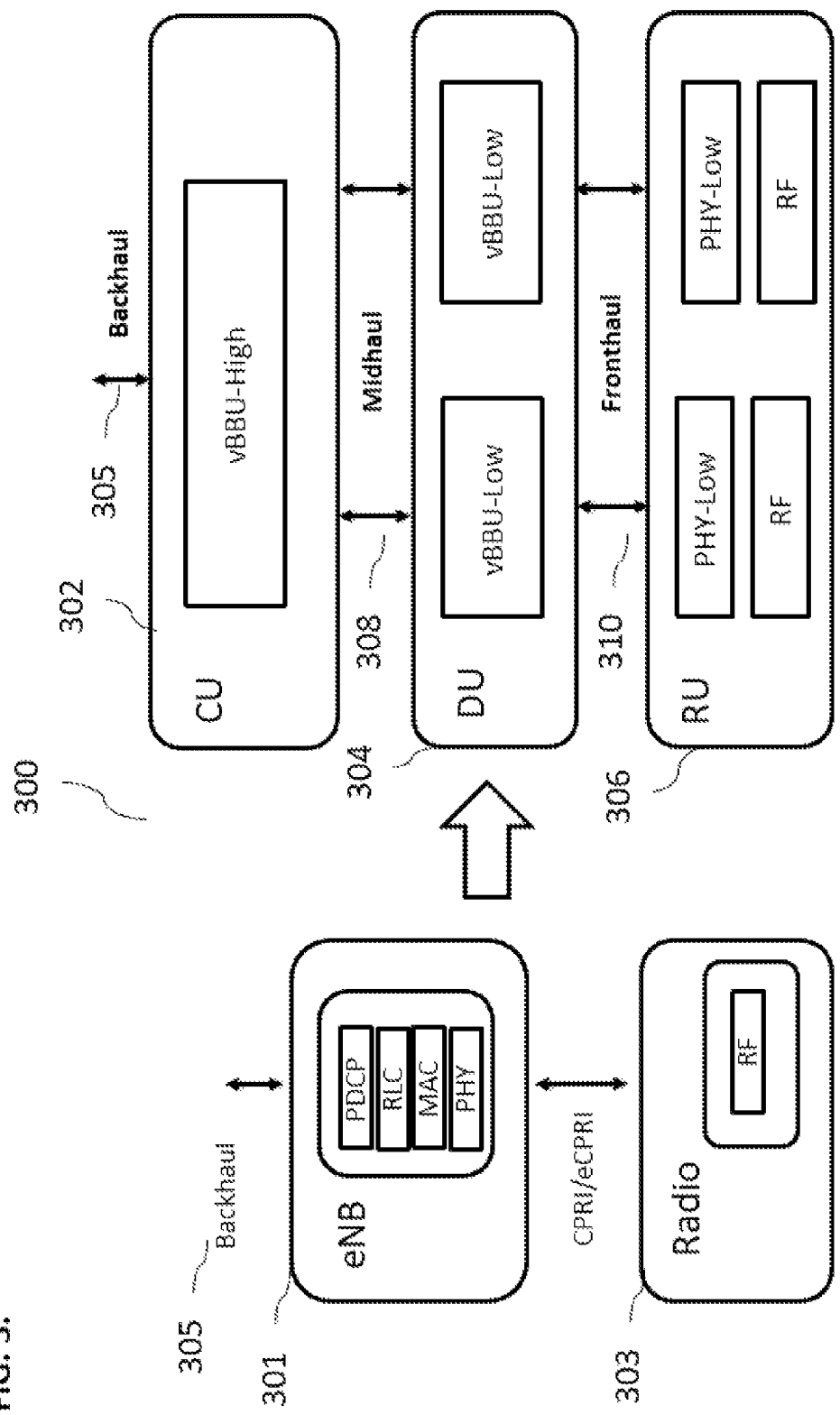
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308.

The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split ("LLS") architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer split architecture (e.g., Option 7) can include a receiver in the uplink, joint processing across multiple transmission points (TPs) for both DL/UL, and transport bandwidth and latency requirements for ease of deployment. Further, the current subject matter's lower layer split architecture can include a split between cell-level and user-level processing, which can include cell-level processing in remote unit ("RU") and user-level processing in DU. Further, using the current subject matter's lower layer split architecture, frequency-domain samples can be transported via Ethernet fronthaul, where the frequency-domain samples can be compressed for reduced fronthaul bandwidth.

Figure 4:
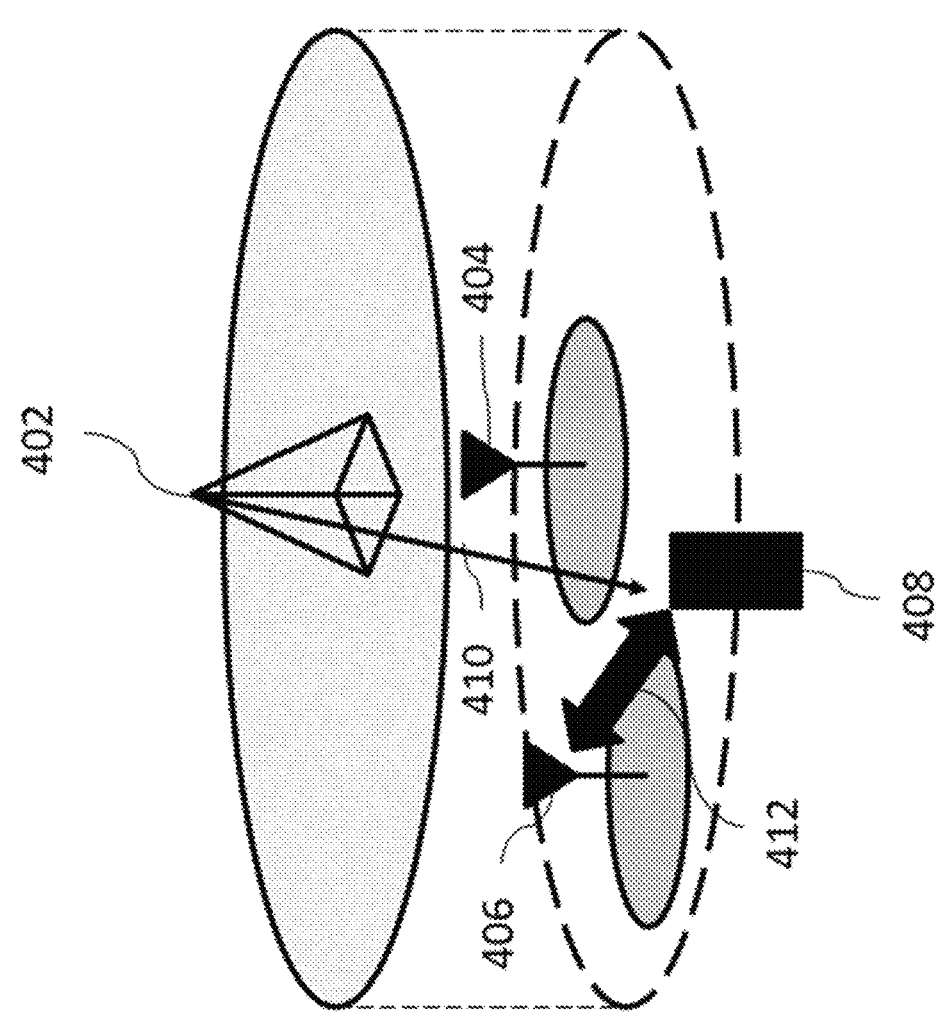
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
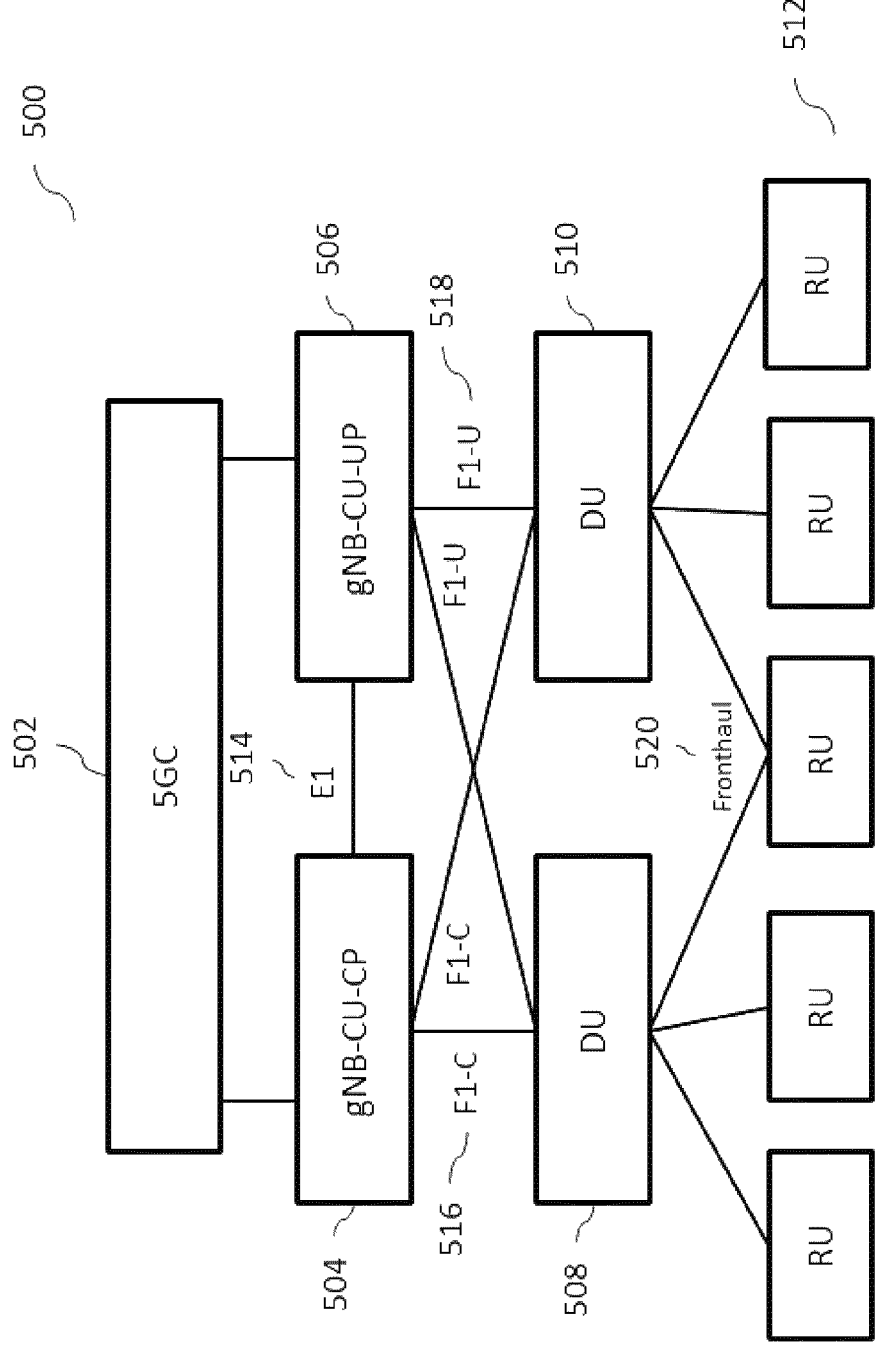
FIG. 5*a* illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
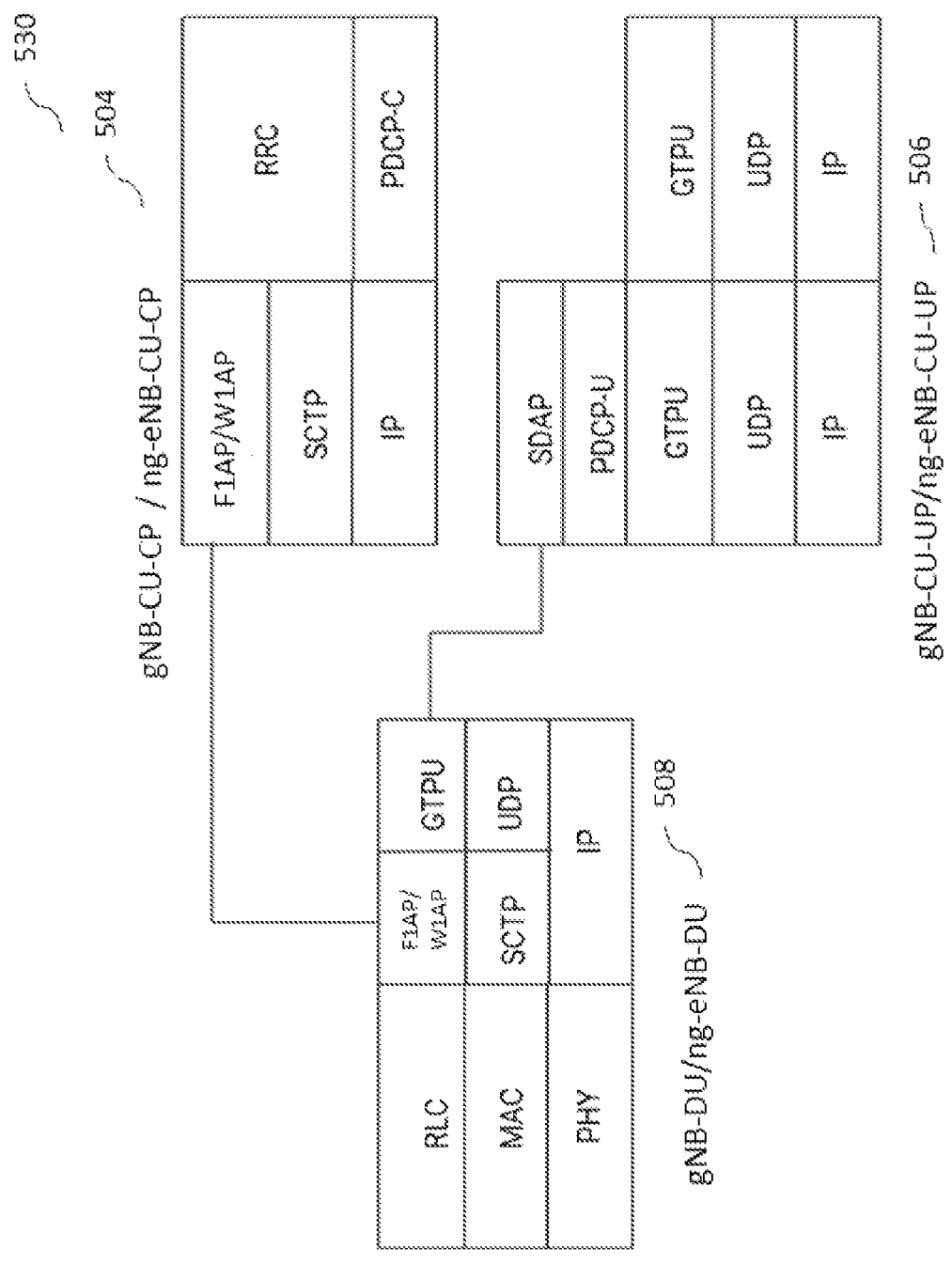
FIG. 5*b* illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
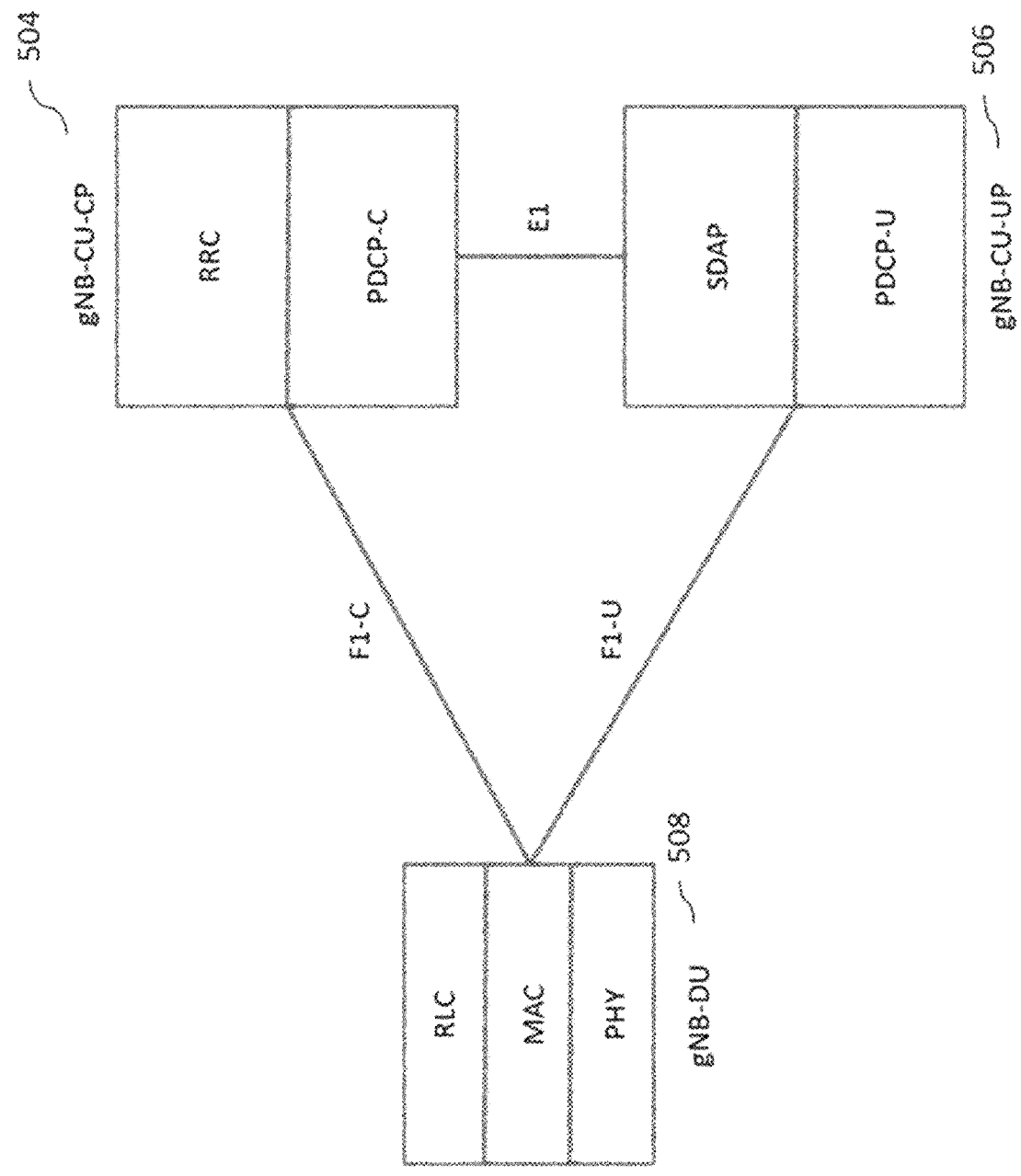
FIG. 5*c* illustrates an exemplary functional split in the gNB architecture shown in FIGS. 5*a-b;*

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Clock Selection In A Fronthaul Network

In some implementations of the current subject matter, a distributed unit (DU) can act as a timing grandmaster (also referred to as a "grandmaster" or a "primary clock") in an O-RAN architecture to synchronize timing and frequency on the architecture's fronthaul network. The fronthaul network is extremely sensitive to latency and jitter. An RU typically expects C-plane and U-plane messages at exact time windows, slot-by-slot. The arrival times of the first and last messages at the RU and the DU for a particular slot and/or symbol are specifically dependent on the respective receive window parameters/designs. Thus, any latency and/or jitter in the fronthaul connection that may contribute to timing errors can have a detrimental effect on the functioning of the RU and/or the DU as timing errors would lead to clocks for the receive/transmit window periods to drift causing slot and symbol boundaries to be missed. Synchronization may reduce, if not eliminate, the effects of latency and jitter so the RUs and DUs perform properly.

The grandmaster can transmit synchronization information to the clocks residing on its segment of the network. All the clocks that receive the synchronization information from the grandmaster can synchronize directly to the grandmaster. A precision time protocol (PTP) (as originally defined in IEEE 1588-2002 standard) can be used to synchronize clocks. The PTP can be used to achieve clock accuracy in a sub-microsecond range. Both DUs and RUs can be configured to use PTP protocol for the purposes of clock synchronization.

The O-RAN architecture can include a plurality of DUs with at least two of the DUs being capable of serving as a grandmaster for a plurality of RUs. Only one DU may be selected to serve as grandmaster at a time. If the DU currently serving as grandmaster is taken offline or experiences an error, communications on the fronthaul connection may not occur properly or at all. Examples of such errors are the DU being in a locked state or holdover, and the DU having an internal error and jitters that may cause delays in C-plane and U-plane packet transmissions over the fronthaul connection. If a DU is in holdover, the RU can automatically select a new grandmaster as discussed herein, e.g., by using BMCA mechanism, since the DU in holdover is going to advertise degraded clock quality. Selecting a new grandmaster among the DUs capable of serving as grandmaster, but not currently serving as grandmaster, may allow the problematic DU currently serving as grandmaster to be relieved of its grandmaster duties so synchronization may properly happen using the new grandmaster. However, such switching to a different grandmaster DU is not currently supported by O-RAN, when the timing stack in the DU currently serving as timing grandmaster is running properly but there is a problem in rest of the DU application.

In some implementations of the current subject matter, one DU among a plurality of DUs capable of serving as a grandmaster in an O-RAN architecture can be selected to serve as grandmaster. In some implementations of the current subject matter, a service management and orchestration (SMO) to which the plurality of DUs is communicatively coupled can trigger the selection of the new grandmaster by the RU. Such implementations may be considered a hybrid model since the SMO and a DU can each provide control to one or more RUs. The SMO can trigger one or more RUs to switch to another DU as grandmaster, and the new grandmaster DU can provide synchronization control to the one or more RUs in its role as grandmaster. The hybrid model may allow for grandmaster switching in the event that the DU currently serving as grandmaster experiences a failure that prevents it from triggering the switch to a new grandmaster. In other implementations of the current subject matter, the SMO can trigger the RU's selection of the new grandmaster through a DU. Such implementations may be considered a hierarchical model since multiple DUs provide control to one or more RUs. The DU currently serving as grandmaster can trigger one or more RUs to switch to another DU as grandmaster, and the new grandmaster DU can provide synchronization control to the one or more RUs in its role as grandmaster. The hierarchical model may allow the SMO to use its processing resources for other tasks and/or may reduce overall bandwidth use on the network since communications for grandmaster switching may occur on the fronthaul connection (fronthaul communications link) between DUs and RUs.

The NETCONF/YANG protocol (or application layer mode of communication) can be used for operations and/or management of network functions. The NETCONF/YANG is a network management protocol developed and standardized by the Internet Engineering Task Force (IETF) under RFC 4741 and RFC 6241 standards. The NETCONF/YANG protocol provides mechanisms to install, manipulate, and delete configuration of network devices.

In some implementations of the current subject matter, a request received by an RU from the SMO (hybrid model) or the DU (hierarchical model) to trigger the grandmaster switch from one DU to another DU can be transmitted in accordance with the NETCONF/YANG protocol as a remote procedure call (RPC) request in o-ran-sync.yang. Clock selection may thus take advantage of existing network functionality.

Figure 6:
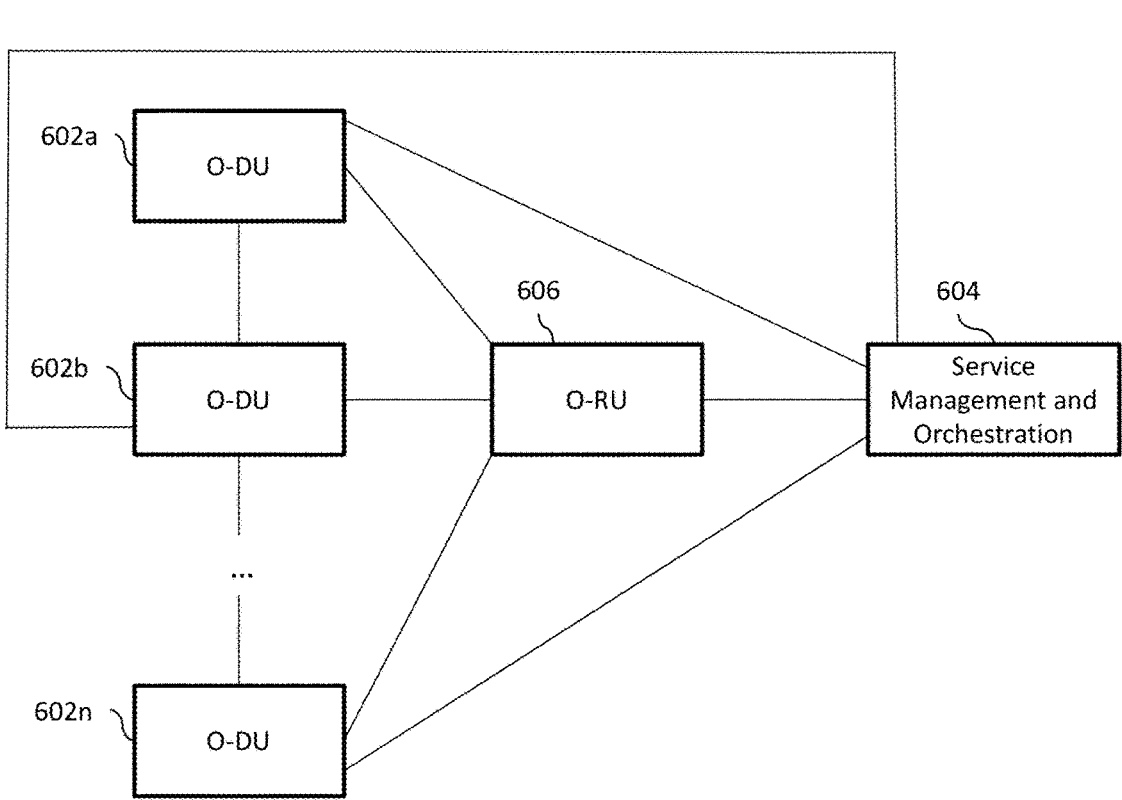
FIG. 6 illustrates an exemplary system that may be used in clock selection in a fronthaul network, according to some implementations of the current subject matter.
Figure 7:
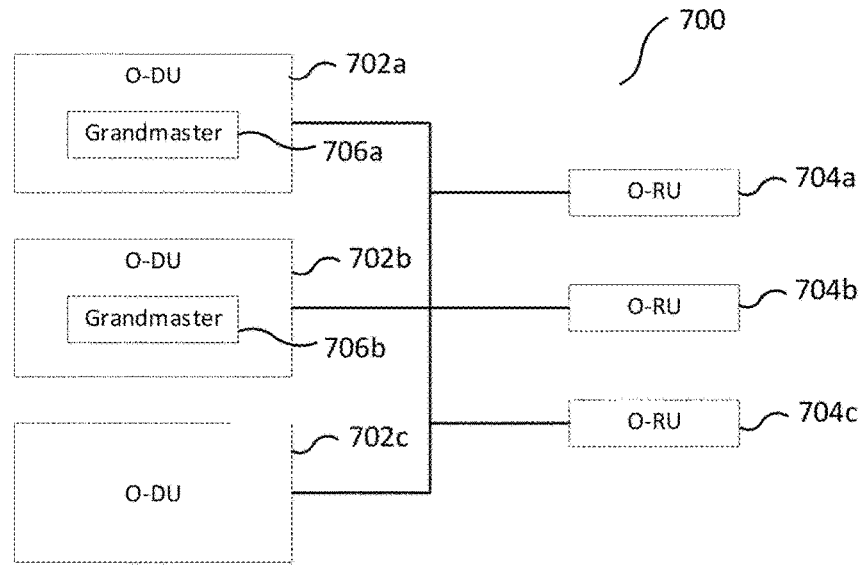
FIG. 7 illustrates an exemplary implementation of the system of FIG. 6, according to some implementations of the current subject matter.
Figure 8:
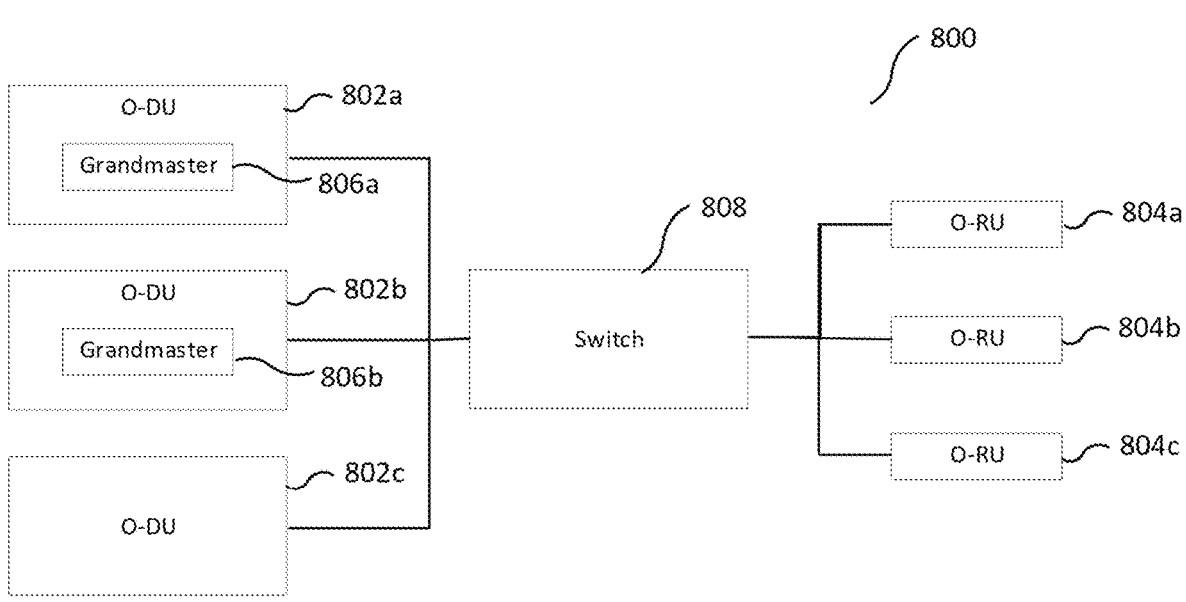
FIG. 8 illustrates another exemplary implementation of the system of FIG. 6, according to some implementations of the current subject matter.

Table 1 shows types of messages that may be transmitted on a fronthaul communications link between a DU and an RU (e.g., the fronthaul connection 310 between the DU 304 and the RU 306 of FIG. 3, a fronthaul connection on the fronthaul network 520 between the DU 508 and one of the RUs 512 of FIG. 5*a*, a fronthaul connection on the fronthaul network 520 between the DU 510 and one of the RUs 512 of FIG. 5*a*, a fronthaul connection between the RU 604 and one of the DUs 602*a*, 602*b*, . . . 602*n* of FIG. 6, a fronthaul connection between one of the RUs 704*a*, 704*b*, 704*c* and one of the DUs 702*a*, 702*b*, 702*c* of FIG. 7, a fronthaul connection between one of the RUs 804*a*, 804*b*, 804*c* and one of the DUs 802*a*, 802*b*, 802*c* of FIG. 8, etc.) along with directions of transmission. The messages can be transmitted in the control plane (C-plane), the user plane (U-plane), a synchronization plane (S-plane), and a management plane (M-plane). The C-plane can include uplink and downlink messages (both DU to RU). The U-plane can also include uplink (RU to DU) and downlink (DU to RU) messages, where IQ samples can be transmitted to/from user equipment. The uplink/downlink directions are not applicable to the transmission of messages in the synchronization and management planes. The S-plane includes messages carrying timing information as related to the timing grandmaster. The M-plane carries messages related to configuration (DU to RU) and notifications/measurements (RU to DU).

TABLE 1

| Control Plane (C-Plane) | To instruct the RU slot by slot which physical resource blocks carry the user plane IQ samples information. For massive MIMO RU, the C-plane messages also carry beamforming weights. | Uplink Downlink | DU to RU DU to RU |
|---|---|---|---|
| User Plane (U-Plane) | IQ samples from/ to UE | Uplink Downlink | RU to DU DU to RU |
| Synchronization Plane (S-Plane) | To distribute timing and frequency | Uplink/ downlink not applicable | Timing Grandmaster Switch to DU and RU DU to RU |
| Management Plane (M-Plane) | To manage the configuration, alarms and statistics of RU | Uplink/ downlink not applicable | DU to RU for configuration RU to DU for alarm notifications and performance measurements |

As mentioned above, LLS architecture can include lower layer split architecture can include a split between cell-level and user-level processing, which can include cell-level processing in the RU and user-level processing in the DU. In an O-RAN architecture, the LLS Control-plane (LLS-C) logical interface between the RU and the DU can be used for C-plane communications between the RU and the DU. Time synchronization (clocks (e.g., of the RU and DU) are synchronized to a common time) and frequency synchronization (clocks (e.g., of the RU and DU) are synchronized in frequency) can facilitate effective C-plane communication.

The O-RAN Working Group 4 (Open Fronthaul Interfaces WG), "Control, User and Synchronization Plane Specification" specifies the C-plane, U-plane, and S-plane protocols used over a fronthaul connection for a DU (O-DU) and an RU (O-RU) with a lower layer split (LLS) architecture. In each of an LLS-C1 architecture and an LLS-C2 architecture, the DU can act as the timing grandmaster, e.g., as the G.8275.2 precision time protocol (PTP) master on the fronthaul connection for the RU. In the LLS-C1 architecture, the RU directly synchronizes with the DU. In the LLS-C2 architecture, the RU does not directly synchronize with the DU as one or more switches are located between the RU and the DU.

FIG. 6 illustrates an implementation of a system 600 that may be used in clock selection in a fronthaul network, according to some implementations of the current subject matter. The system 600 can be a radio access network operating in a wireless communication environment (e.g., 4G, LTE, 5G, etc.). The system 600 as shown in FIG. 6 is an O-RAN architecture and may include other components as discussed above and as will be appreciated by those skilled in the art.

The system 600 can include one or more distributed units DUs 602*a*, DU 602*b*, . . . DU 602*n*, a service management and orchestration (SMO) component 604, and a radio unit (RU) 606. In FIG. 6, the suffix "n" denotes an integer variable equal to three or greater to indicate that any number of DUs may be included in the system 600. Also, the DUs 602*a*, DU 602*b*, . . . DU 602*n* in FIG. 6 are shown as "O-DU"s to denote that the DUs in this illustrated implementation are O-RAN distributed units (e.g., the DUs are components in an O-RAN architecture), and the RU 606 in FIG. 6 is shown as an "O-RU" to denote that the RU in this illustrated implementation is an O-RAN radio unit (e.g., the RU is a component in an O-RAN architecture).

The DUs 602*a*, 602*b*, 602*n* can be configured to be communicatively coupled to the SMO component 604. The SMO component 604 can be configured to be communicatively coupled to the RU 606. Two or more DUs 602*a*, 602*b*, 602*n* can also be configured to be communicatively coupled to one another, where one of the DUs 602*a*, 602*b*, . . . 602*n* (e.g., a first DU 602*a*) can be implemented and/or can serve as a host and/or a primary distributed unit while one or more other of the DUs 602*a*, 602*b*, 602*n* (e.g., second to nth DUs 602*b*, 602*n*) are implemented and/or serve as tenant and/or secondary and/or shared resource operator distributed units.

In some implementations, the DUs 602*a*, 602*b*, . . . 602*n* can be of the same mobile network operator (MNO). In other implementations, one or more of the DUs 602*a*, 602*b*, 602*n* can be of a different MNO than one or more of the other DUs 602*a*, 602*b*, 602*n*.

FIG. 7 illustrates a system 700 that is an implementation of the system 600 in an LLS-C1 architecture. The system 700 can include one or more DUs 702*a*, 702*b*, 702*c* that can each be communicatively coupled to one or more RUs 704, 704*b*, 704*c*. The system 700 is shown with three DUs 702*a*, 702*b*, 702*c*, but another number of DUs is possible. Also, the system 700 is shown with three RUs 704, 704*b*, 704*c*, but another number of DUs is possible. The system 700 also includes an SMO (e.g., the SMO 604) that can be communicatively coupled to the DUs 702*a*, 702*b*, 702*c*.

Two of the DUs 702*a*, 702*b* in this illustrated implementation include a grandmaster 706*a*, 706*b*. The grandmasters 706*a*, 706*b* are shows in FIG. 7 as being integrated with their respective DUs 702*a*, 702*b*, but one or more of the grandmasters 706*a*, 706*b* may be external thereto and communicatively coupled therewith so as to be uniquely associated with its respective DU 702*a*, 702*b*. A third one of the DUs 702*c* in this illustrated implementation is not configured to serve as a grandmaster. Thus, one of the two DUs 702*a*, 702*b* may serve as grandmaster at a time for the one or more RUs 704*a*, 704*b*, 704*c*. In other words, every DU in the LLS-C1 architecture is configured to serve as a grandmaster except for one of the DUs. Other implementations in an LLS-C1 architecture can have another combination of one or more DUs configured to serve as grandmaster and zero or more DUs not configured to serve as grandmaster, e.g., every DU in an LLS-C1 architecture being configured to serve as a grandmaster, every DU in an LLS-C1 architecture being configured to serve as a grandmaster except for two of the DUs, every DU in an LLS-C1 architecture being configured to serve as a grandmaster except for three of the DUs, etc.

FIG. 8 illustrates a system 800 that is an implementation of the system 600 in an LLS-C2 architecture. The system 800 can include one or more DUs 802*a*, 802*b*, 802*c* that can each be communicatively coupled to one or more RUs 804*a*, 804*b*, 804*c* via a switch 808. The system 800 is shown with three DUs 802*a*, 802*b*, 802*c*, but another number of DUs is possible. Also, the system 800 is shown with three RUs 804, 804*b*, 804*c*, but another number of DUs is possible. The system 800 also includes an SMO (e.g., the SMO 604) that can be communicatively coupled to the DUs 802*a*, 802*b*, 802*c*.

Two of the DUs 802*a*, 802*b* in this illustrated implementation include a grandmaster 806*a*, 806*b*, which can include, for example, a time synchronization card. The grandmasters 806*a*, 806*b* are shows in FIG. 8 as being integrated with their respective DUs 802*a*, 802*b*, but one or more of the grandmasters 806*a*, 806*b* may be external thereto and communicatively coupled therewith so as to be uniquely associated with its respective DU 802*a*, 802*b*. A third one of the DUs 802*c* in this illustrated implementation is not configured to serve as a grandmaster. Thus, one of the two DUs 802*a*, 802*b* may serve as grandmaster at a time for the one or more RUs 804, 804*b*, 804*c*. In other words, every DU in the LLS-C2 architecture is configured to serve as a grandmaster except for one of the DUs. Other implementations in an LLS-C2 architecture can have another combination of one or more DUs configured to serve as grandmaster and zero or more DUs not configured to serve as grandmaster, e.g., every DU in an LLS-C2 architecture being configured to serve as a grandmaster, every DU in an LLS-C2 architecture being configured to serve as a grandmaster except for two of the DUs, every DU in an LLS-C2 architecture being configured to serve as a grandmaster except for three of the DUs, etc.

Figure 9:
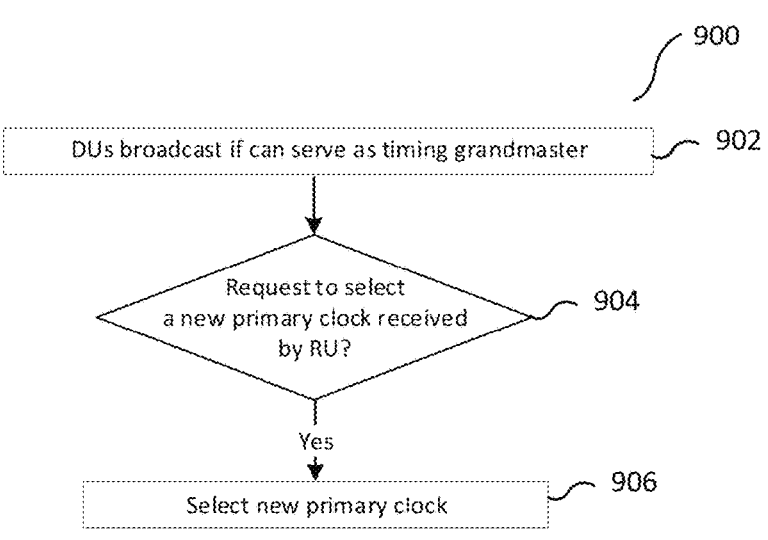
FIG. 9 illustrates an exemplary method for clock selection in a fronthaul network, according to some implementations of the current subject matter.

FIG. 9 illustrates one implementation of a method 900 for performing clock selection in a fronthaul network, according to some implementations of the current subject matter. The method 900 is described with respect to an implementation of a system 1000 shown in FIG. 10 for ease of explanation but can be implemented with respect to another system, e.g., the system 600 of FIG. 6 (e.g., the system 700 of FIG. 7, the system 800 of FIG. 8, etc.), etc.

Figure 10:
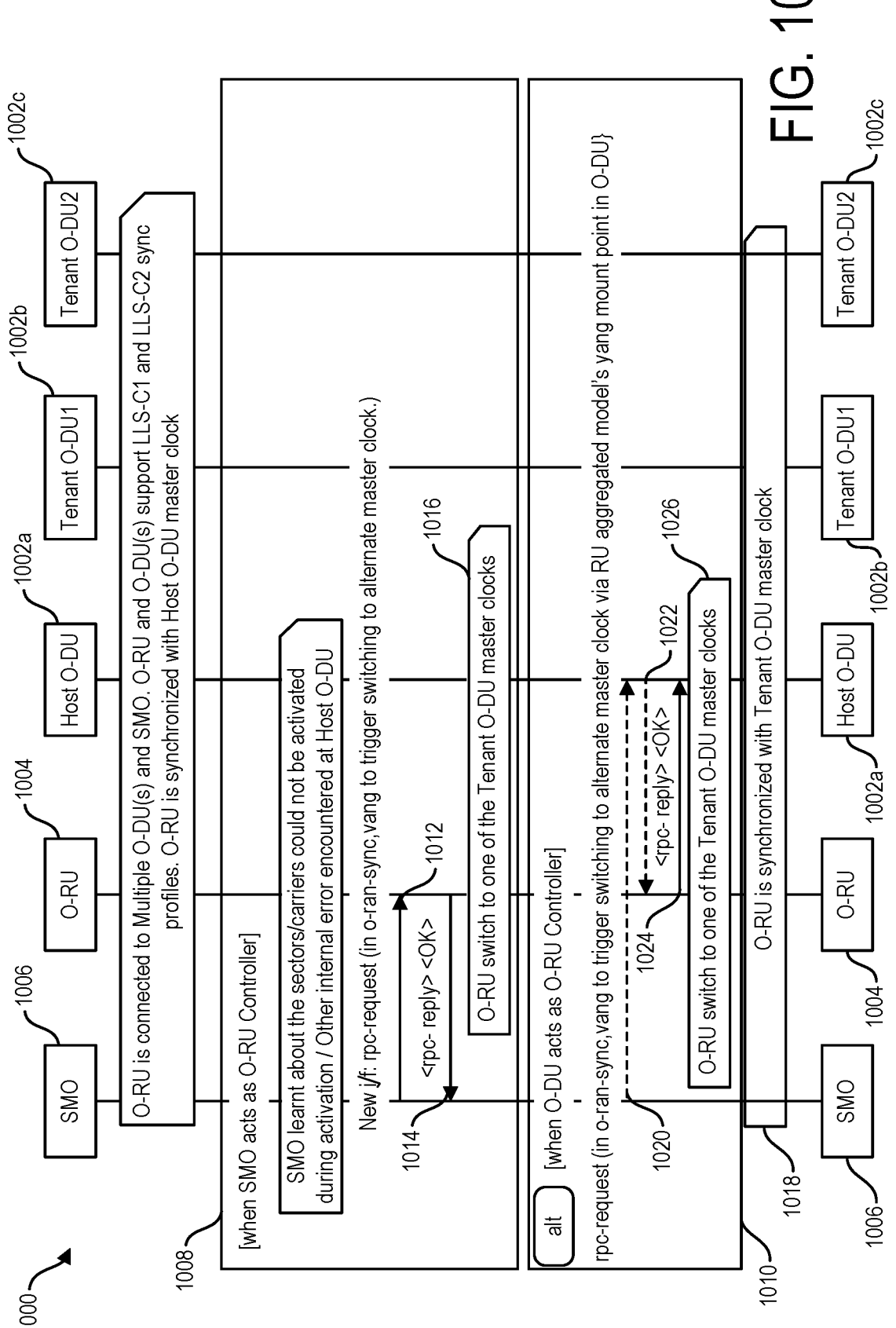
FIG. 10 illustrates an exemplary implementation of a system in which the method of FIG. 9 may be implemented, according to some implementations of the current subject matter.

The system 1000 of FIG. 10 can be generally configured and used similar to that discussed above regarding the system 600 of FIG. 6. The system 1000 can include first, second, and third DUs 1002*a*, 1002*b*, 1002*c*, an RU 1004 connectively coupled to the DUs 1002*a*, 1002*b*, 1002*c* (in an LLS-C1 architecture, e.g., as in FIG. 7, or in an LLS-C2 architecture, e.g., as in FIG. 8), and an SMO 1006 communicatively coupled to the DUs 1002*a*, 1002*b*, 1002*c*. As discussed above, a different number of DUs and a different number of RUs are possible.

The first DU 1002*a* (labeled as the "Host DU" in FIG. 10) is the current grandmaster. As shown in FIG. 10, a clock of the RU 1004 is synchronized with a clock of the Host DU 1002*a*, e.g., with the timing grandmaster. The second and third DUs 1002*b*, 1002*c* are shown in FIG. 10 as Tenant DUs.

The method 900 can include each of the DUs 1002*a*, 1002*b*, 1002*c* broadcasting (e.g., advertising) 902 if it can serve as timing grandmaster. For purposes of discussing the method 900 of FIG. 9, all of the DUs 1002*a*, 1002*b*, 1002*c* are considered as being capable of serving as grandmaster. However, as discussed above, one or more DUs in a system may be incapable of serving as grandmaster where two or more other DUs in the system are capable of serving as grandmaster. Thus, in this illustrated implementation, each of the DUs 1002*a*, 1002*b*, 1002*c* broadcasts 902 that it can serve as timing grandmaster.

The broadcasting 902 can include each of the DUs 1002*a*, 1002*b*, 1002*c* broadcasting 902 its grandmaster capability to the RU 1004, which may be helpful to the RU 1004 in selecting a new primary clock in either a hybrid model 1008 or a hierarchical model 1010. The broadcasting 902 can be triggered upon connection of a DU to the fronthaul network. In other words, connection of a DU to the fronthaul network can trigger the DU to broadcast 902 whether it can serve as grandmaster. The newly connected DU may thus be very quickly available to serve as a grandmaster.

When a new primary clock is needed 904, a new primary clock can be selected. A new primary clock may be needed 904 under a variety of different circumstances. For example, as discussed above, the current primary clock may experience an error that does or could impair its ability to serve as grandmaster such that a new primary clock should be selected. A new primary clock may thus be dynamically selected based on a failure status of the primary clock indicated to the RU 1004 by a request transmitted to and received 906 by the RU 1004.

The primary clock is aware of its own status, e.g., aware of an error encountered that is configured to automatically trigger a change in grandmaster. In response to detection of such an error, in each of the hybrid model 1008 and the hierarchical model 1010, the current primary clock, e.g., the Host DU 1002*a*, can be configured to transmit a notification to the SMO 1006 that a new grandmaster is needed. The notification may or may not include information indicating why a new grandmaster is needed, e.g., may or may not identify the error that occurred. The first DU 1002*a* identifying that the error occurred per its typical functionality can be configured to trigger the transmission of the notification to the SMO 1006. The receipt of the notification at the SMO 1006 can be configured to cause the SMO 1006 to remove the Host DU 1002*a* from possible future selection as the grandmaster since the notification has informed the SMO 1006 that the Host DU 1002*a* is unsuitable to serve as grandmaster. The error at the Host DU 1002*a* being resolved can be configured to trigger the Host DU 1002*a* to re-broadcast that it can serve as timing grandmaster, which may allow it to again be considered for serving as grandmaster.

For another example, in either the hybrid model 1008 or the hierarchical model 1010, the Host DU 1002*a* may be taken offline and no longer be able to communicate on the fronthaul network. The SMO 1006 is aware of the offline status of the Host DU 1002*a* per typical functionality of the SMO 1006.

For yet another example, in either the hybrid model 1008 or the hierarchical model 1010, a predetermined amount of time may be determined by the SMO 1006 to have passed since the Host DU 1002*a* was selected as the grandmaster. The passage of the predetermined amount of time can be configured to automatically trigger a change in grandmaster. Using time as a trigger to change the grandmaster may help provide efficient load balancing by helping to prevent one DU from having a more burdensome processing load than other ones of the DUs since the DUs can take turns serving as the grandmaster. The predetermined amount of time can be stored in a memory of the SMO 1006, with a counter or timer of the SMO 1006 being used to track when the predetermined amount of time has passed. The predetermined amount of time can be, for example, ten minutes, although other times are possible.

Regardless of whether the system is configured as the hybrid model 1008 or the hierarchical model 1010, the SMO 1006 triggers the RU 1004 to select a new primary clock. In some implementations of the current subject matter, only a hierarchical model may be provided for a fronthaul network. In some implementations of the current subject matter, only a hybrid model may be provided for a fronthaul network. In some implementations of the current subject matter, each of a hierarchical model and a hybrid model may be provided for a fronthaul network, with only one of the hierarchical and hybrid models being active at a time, e.g., as controlled by the SMO 1006.

In some implementations of the current subject matter, the selection 906 of the new primary clock can be performed by the RU 1004 by running the Best Master Clock Algorithm (BMCA) to select a new primary clock from among the Tenant DUs 1002b, 1002c (e.g., the DUs not currently serving as primary clock) with a known capability of serving as grandmaster. The previously performed broadcasting 902 (and re-broadcasting, if performed by any of the DUs 1002a, 1022b, 1002c) provided such knowledge to the RU 1004. Using the BMCA to select the new primary clock takes advantage of existing functionality. Selection of new primary clock by the RU 1004 can be accomplished beyond PTP1588 BMCA mechanism as by default clock selection is done by the RU 1004 using PTP BMCA.

In some implementations of the current subject matter, the grandmaster can be selected 906 based on a predetermined selection order of the DUs 1002a, 1002b, 1002c instead of by running the BMCA. The predetermined selection order can be based on, for example, an order in which the DUs 1002a, 1002b, 1002c connected to the fronthaul network, which may allow the predetermined selection order to dynamically adjust to reflect any new DUs that connect to the fronthaul network and broadcast grandmaster capability. Basing grandmaster selection 906 on the predetermined selection order may facilitate load balancing since each DUs 1002a, 1002b, 1002c will be selected 906 to serve as grandmaster as far apart in time as possible.

As shown in FIG. 10, in the hybrid model 1008, in response to knowing that the current grandmaster DU, e.g., the first DU 1002a, is encountering errors, the SMO 1006 can transmit 1012 a request to the RU 1004 that informs 908 the RU 1004 to select a new primary clock. The request can be an RPC request in o-ran-sync.yang. The receipt 904 of the RPC request at the RU 1004 can trigger the RU 1004 to select the new primary clock, e.g., run the BMCA, to switch 1016 from the Host DU 1002a as the grandmaster to the newly selected DU 1002b or 1002c as the grandmaster. The switching 1016 can include the RU 1004 synchronizing its clock with the new primary clock, e.g., the second DU 1002b or the third 1002c The receipt 904 of the RPC request at the RU 1004 can also trigger the RU 1004 to transmit 1014 a reply to the SMO 1006 acknowledging receipt 906 of the RPC request. The transmitted 1014 reply can also indicate that the RU 1004 has successfully performed the switch 1016. In some implementations, the switching 1016 occurs after the reply has been transmitted 1014, in which case the reply includes no such indication.

In some implementations of the hybrid model, in response to knowing that the current grandmaster DU is encountering errors, the SMO 1006 can transmit an acknowledgment message to the Host DU 1002a. The Host DU 1002a may thus be informed that it does not need to perform any further operations related to serving as grandmaster, if such performance has not already ceased due to occurrence of one or more errors.

As shown in FIG. 10, in the hierarchical model 1010, in response to knowing that the current grandmaster DU, e.g., the first DU 1002a, is encountering errors, the SMO 1006 can transmit 1020 a message to the Host DU 1002a requesting the Host DU 1002a to transmit 1022 a request to the RU 1004 that informs the RU 1004 to select a new primary clock. The request is an RPC request in o-ran-sync.yang. The receipt 906 of the RPC request at the RU 1004 can trigger the RU 1004 to select a new primary clock, e.g., run the BMCA, from one of other DUs 1002b or 1002c. The switching 1026 can include the RU 1004 synchronizing its clock with the new primary clock, e.g., the second DU 1002b or the third DU 1002c. The receipt 906 of the RPC request at the RU 1004 can also trigger the RU 1004 to transmit 1024 a reply to the first DU 1002a that transmitted 1022 the RPC request to the DU 1004 acknowledging receipt 906 of the RPC request. The transmitted 1024 reply can also indicate that the RU 1004 has successfully performed the switch 1026. In some implementations, the switching 1026 occurs after the reply has been transmitted 1024, in which case the reply includes no such indication.

The method 900 can then continue, repeatedly, with another selection 906 of a grandmaster if a need 904 again arises.

Only one RU 1004 is shown in the implementation of FIG. 10, but there can be a plurality of RUs to which the Host DU 1002a is serving as grandmaster that similarly switch to a new grandmaster with each RU receiving an RPC request as described above to trigger the switching.

Figure 11:
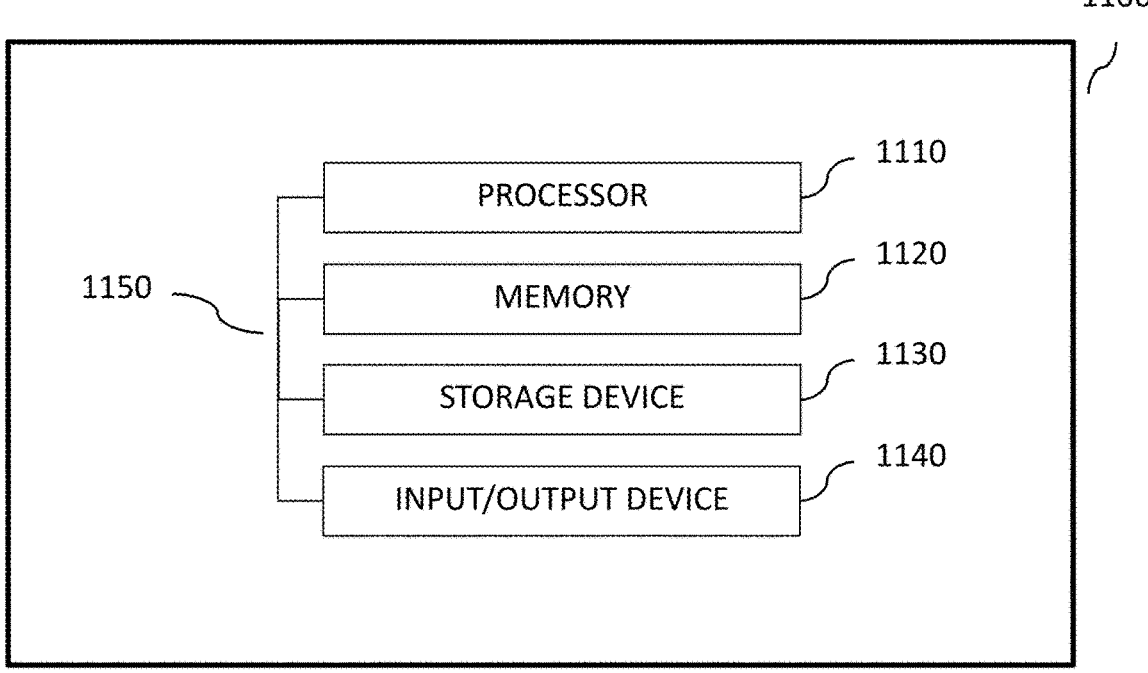
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
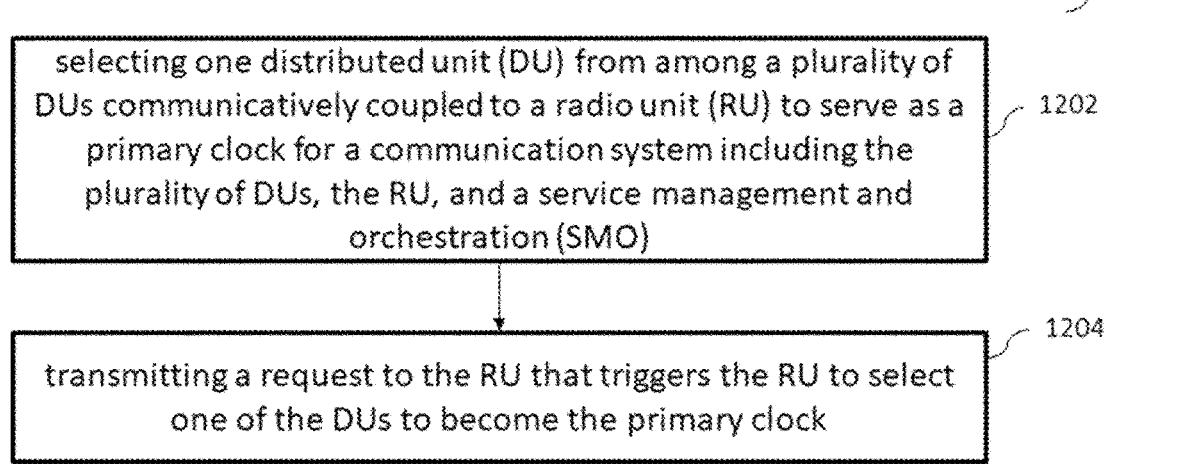
FIG. 12 illustrates an exemplary method, according to some implementations of the current subject matter.

FIG. 12 illustrates an exemplary method 1200 for clock selection in a fronthaul network, according to some implementations of the current subject matter. The method 1200 may be performed, for example, using implementations shown in and described with respect to FIGS. 6-10.

The method 1200 includes selecting 1202 one distributed unit from among a plurality of DUs (e.g., DU 304 of FIG. 3, DUs 508, 510 of FIGS. 5a-5c, DUs 602a, 602b, 602n of FIG. 6, DUs 702a, 702b, 702c of FIG. 7, DUs 802a, 802b, 802c of FIG. 8, DUs 1002a, 1002b, 1002c of FIG. 10, etc.) communicatively coupled to a radio unit (e.g., RU 306 of FIG. 3, RU 512 of FIG. 5a, RU 606 of FIG. 6, RUs 704a, 704b, 704c of FIG. 7, RUs 804a, 804b, 804c of FIG. 8, RU 1004 of FIG. 10, etc.) to serve as a primary clock for a communication system including the plurality of DUs, the RU, and a service management and orchestration (e.g., SMO 604 of FIG. 6, SMO 1006 of FIG. 10, etc.). The method 1200 also includes transmitting 1204 a request to the RU that triggers the RU to select one of the DUs to become the primary clock. The SMO is communicatively coupled to the RU and the plurality of DUS.

In some implementations, the current subject matter can include one or more of the following optional features.

In some implementations, the SMO may trigger the selecting. Further, the SMO may transmit the request to the RU.

In some implementations, the SMO may trigger the selecting through one of the DUs to instruct the RU to perform the selecting. Further, the selected one of the DUs may transmit the request to one or more RUs using the DU as the primary clock previously.

In some implementations, the method may further include receiving a signal from each of the DUs among the plurality of DUs capable of serving as a primary clock, and the selecting may be only among the plurality of DUs capable of serving as a primary clock.

In some implementations, a one of the DUs may be serving as the primary clock at a time of or just prior to the selecting being performed, and the method may further include removing the one of the DUs from consideration as being selected. Further, the removal may remove the one of the DUs from the selecting and from future selecting, and/or a failure of the one of the DUs may trigger the selecting.

In some implementations, the request may be a remote procedure call (RPC) request.

In some implementations, the communication system may include an Open Radio Access Network (O-RAN) architecture.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
determining to switch a primary clock for a communication system from one distributed unit (DU), from among a plurality of DUs communicatively coupled to a radio unit (RU), the communication system including the plurality of DUs, the RU, and a service management and orchestration (SMO); and
based on the determining, transmitting a request that triggers the RU to select another DU of the plurality of DUs to become the primary clock,
wherein the SMO is communicatively coupled to the RU and the plurality of DUs, and
wherein the SMO determines to switch the primary clock for the communication system.

2. The method of claim 1, wherein the SMO transmits the request to the RU.

3. The method of claim 1, wherein the SMO transmits the request to the one DU to instruct the RU to perform the selecting.

4. The method of claim 3, wherein based on the transmitted request, the one DU requests the RU to select the other DU to become the primary clock.

5. The method of claim 1, further comprising receiving a signal from each of the DUs among the plurality of DUs capable of serving as the primary clock;
wherein the selecting is only among the plurality of DUs capable of serving as the primary clock.

6. The method of claim 1, wherein the one DU is serving as the primary clock at a time of or just prior to the selecting being performed; and
the method further comprises removing the one DU from consideration as being selected.

7. The method of claim 6, wherein the removing removes the one DU from the selecting by the RU and from future selecting.

8. The method of claim 6, wherein the determining is triggered by a failure of the one DU.

9. The method of claim 1, wherein the request is a remote procedure call (RPC) request.

10. The method of claim 1, wherein the communication system includes an Open Radio Access Network (O-RAN) architecture.

11. The method of claim 1, wherein a signal indicating that a DU is capable of serving as the primary clock is received from the DU upon the DU connecting to a fronthaul network, which triggers the DU to broadcast the signal.

12. The method of claim 1, wherein the determining is triggered by at least one of:
a notification received by the SMO from the one DU, the notification being transmitted in response to detection of an error by the one DU;
the one DU being offline or otherwise unable to communicate with a fronthaul network;
the one DU having been the primary clock for at least a predetermined amount of time; and
a predetermined selection order of the plurality of DUs.

13. An apparatus, comprising:
at least one processor, and
at least one non-transitory storage media storing instructions that, when executed by the at least one processor, cause the at least one processor to perform operations comprising:
determining to switch a primary clock for a communication system from one distributed unit (DU), from among a plurality of DUs communicatively coupled to a radio unit (RU), the communication system including the plurality of DUs, the RU, and a service management and orchestration (SMO); and
based on the determining, transmitting a request that triggers the RU to select another DU of the plurality of DUs to become the primary clock,
wherein the SMO is communicatively coupled to the RU and the plurality of DUs, and
wherein the SMO determines to switch the primary clock for the communication system.

14. The apparatus of claim 13, wherein the SMO transmits the request to the RU.

15. The apparatus of claim 13, wherein the SMO transmits the request to the one DU to instruct the RU to perform the selecting.

16. The apparatus of claim 15, wherein based on the transmitted request, the one DU requests the RU to select the other DU to become the primary clock.

17. The apparatus of claim 13, wherein the operations further comprise receiving a signal from each of the DUs among the plurality of DUs capable of serving as the primary clock; and
the selecting is only among the plurality of DUs capable of serving as the primary clock.

18. The apparatus of claim 13, wherein the one DU is serving as the primary clock at a time of or just prior to the selecting being performed; and the operations further comprise removing the one DU from consideration by the RU as being selected.

19. The apparatus of claim 13, wherein the request is a remote procedure call (RPC) request.

20. At least one non-transitory storage media storing instructions that, when executed by at least one processor, cause the at least one processor to perform operations comprising:

determining to switch a primary clock for a communication system from one distributed unit (DU), from among a plurality of DUs communicatively coupled to a radio unit (RU), the communication system including the plurality of DUs, the RU, and a service management and orchestration (SMO); and based on the determining, transmitting a request that triggers the RU to select another DU of the plurality of DUs to become the primary clock, wherein the SMO is communicatively coupled to the RU and the plurality of DUs, and wherein the SMO determines to switch the primary clock for the communication system.

* * * * *